United States Patent [19]

Yoshimi et al.

[11] Patent Number: 4,482,007
[45] Date of Patent: Nov. 13, 1984

[54] AIR CONDITIONER CONTROL APPARATUS

[75] Inventors: Akiro Yoshimi, Oubu; Masashi Takagi, Kariya; Masao Sakurai, Oubu; Akio Takemi, Kariya, all of Japan

[73] Assignee: Nippondenso Co., Ltd., Kariya, Japan

[21] Appl. No.: 456,429

[22] Filed: Jan. 7, 1983

[30] Foreign Application Priority Data

Jan. 20, 1982 [JP] Japan .................................. 57-8141

[51] Int. Cl.³ .............................................. F25B 29/00
[52] U.S. Cl. ....................................... 165/21; 165/43; 62/209
[58] Field of Search ............. 165/39, 21, 27, 43; 236/91 F, 916; 417/440

[56] References Cited

U.S. PATENT DOCUMENTS 2,036,543  4/1936  Ross ................................ 417/440
2,328,824  9/1943  McCormick et al. ......... 417/440 X

FOREIGN PATENT DOCUMENTS 55-77659 11/1980 Japan .

Primary Examiner—William E. Wayner
Assistant Examiner—John Sollecito
Attorney, Agent, or Firm—Cushman, Darby & Cushman

[57] ABSTRACT

An apparatus for controlling an air conditioner having a refrigeration cycle including an evaporator disposed in an air passage for supplying air to an area to be air-conditioned and a compressor having a mechanism for varying a volume of discharge from the compressor, comprises signal generator responsive to a humidity in the area to be air-conditioned for producing a signal indicative of the humidity; and means responsive to the signal from the signal generator for actuating the mechanism for varying the volume of discharge from the compressor.

1 Claim, 7 Drawing Figures (a)

(b)

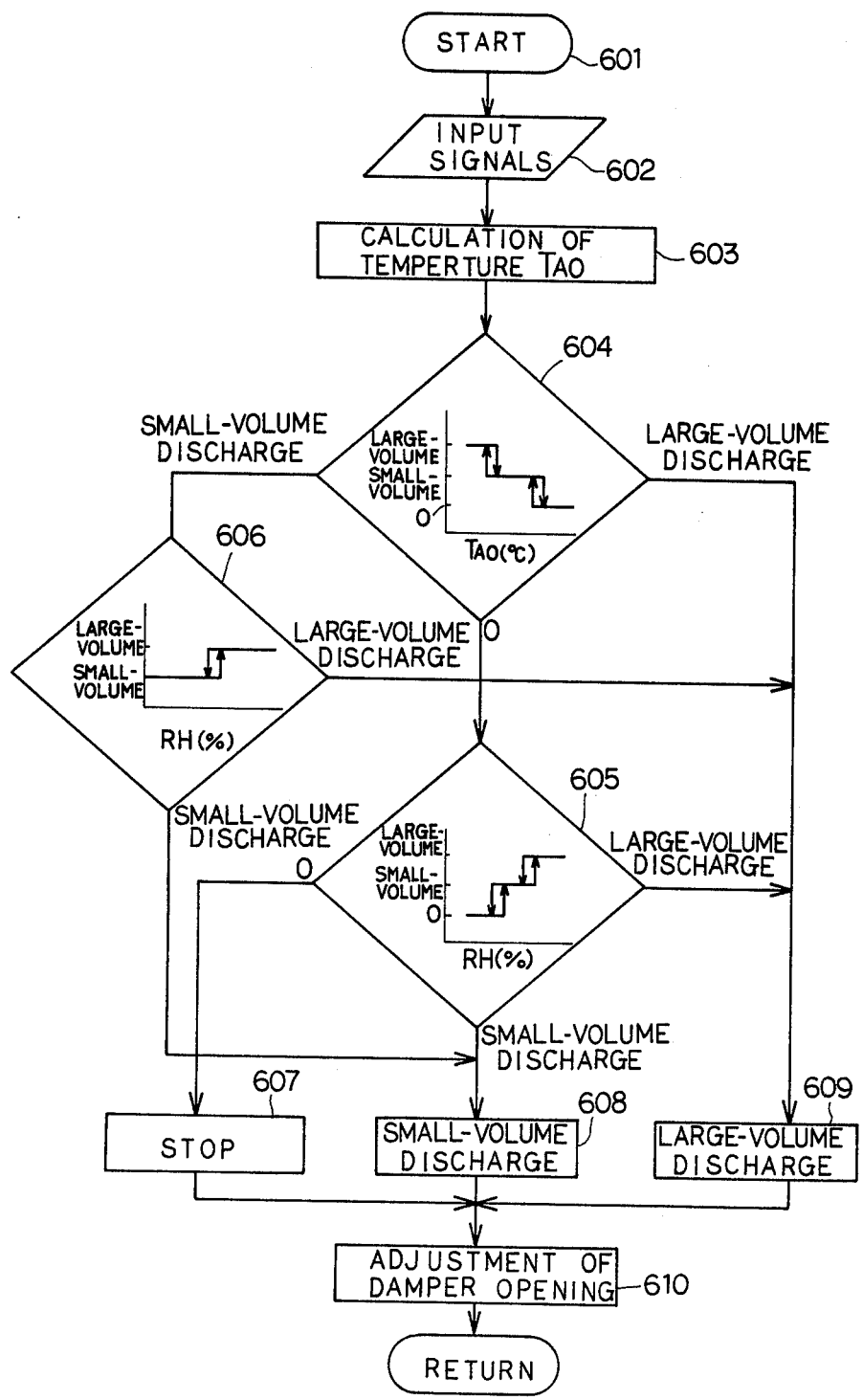

AIR CONDITIONER CONTROL APPARATUS

BACKGROUND OF THE INVENTION

The present invention relates to an air conditioner control apparatus, and more particularly to an air conditioner control apparatus for preventing an area to be air-conditioned from becoming excessively humidified.

Small spaces such as automobile compartments to be air-conditioned are occupied by occupants such as drivers and passengers who have a relatively large volume with respect to that of the space. When such space is air-conditioned, it has a tendency to become excessively humidified, giving occupants discomfort and allowing windows such as a windshield to be frosted.

One known proposal effective for removing humidity from the area to be air-conditioned has been to employ a refrigeration cycle for air cooling with an evaporator used for dehumidification. With the humidity varying continuously, however, the air conditioner needs to be switched on and off in its refrigeration cycle, resulting in widely different loads imposed on a source of drive for the compressor. This condition has led to poor durability and low energy efficiency for the air conditioning system. The conditioner as it is alternately switched on and off abruptly changes the ability of the evaporator to cool air, thus failing to achieve good temperature control.

SUMMARY OF THE INVENTION

It is therefore an object of the present invention to provide an air conditioner control apparatus capable of desired dehumidification while reducing load variations and changes in the degree of cooling.

According to a first aspect of the present invention, an apparatus for controlling an air conditioner having a compressor having a mechanism for varying a volume of discharge from the compressor and a refrigeration cycle with the refrigeration capability and the power load being adjustable, includes means responsive to a humidity in an area to be air-conditioned for actuating the mechanism for varying the volume of discharge from the compressor.

According to a second aspect of the present invention, the mechanism for varying the volume of discharge from the compressor is actuated in response to signals indicative of the humidity and a degree of cooling required in the area to be air-conditioned for performing desired air cooling. Since the volume of discharge from the compressor is increased when the air-conditioned area is humid and when the air temperature in the area is to be lowered, a comfortable temperature and humidity environment can be created.

The degree of cooling in the area is determined dependent on at least the actual temperature in the area, and hence increases as the actual temperature rises. Where the apparatus has an automatic adjustment mechanism for keeing the area at a desired temperature, the degree of cooling required may be regarded as a temperature required of air discharged into the area, and may be determined dependent on the actual temperature and a temperature setting therefor, e.g. dependent on the difference therebetween.

According to a third aspect of the present invention, the mechanism for varying the volume of discharge from the compressor and a mechanism for adjusting the amount of heat generated by a heater are actuated in response to a common signal indicative of the degree of cooling required, to thereby provide an effective air conditioner control apparatus with automatic temperature adjustment in which sensors and an electric circuit arrangement are simplified.

According to a feature of the present invention, there is provided an apparatus for controlling an air conditioner having a refrigeration cycle including an evaporator disposed in an air passage for supplying air to an area to be air-conditioned, a compressor having a mechanism for varying a volume of discharge from the compressor, a heater disposed in the air passage, and a mechanism for adjusting the amount of heat generated by the heater, the apparatus comprising first signal generating means responsive to a humidity in the area to be air-conditioned for producing a first signal indicative of the humidity, second signal generating means responsive to a degree of cooling required in the area to be air-conditioned for producing a second signal indicative of the degree of cooling, third signal generating means responsive to a temperature related to a stream of air discharged from the evaporator for producing a third signal indicative of the temperature, fourth signal generating means responsive to a temperature related to a capability of the heater for producing a fourth signal indicative of the last-mentioned temperature, and means responsive to the first and second signals for actuating the mechanism for varying the volume of discharge from the compressor and responsive to the second, third and fourth signals for actuating the mechanism for adjusting the amount of heat generated by the heater.

The above and other objects, features and advantages of the present invention will become more apparent from the following description when taken in conjunction with the accompanying drawings in which a preferred embodiment of the present invention is shown by way of illustrative example.

Figure 5:
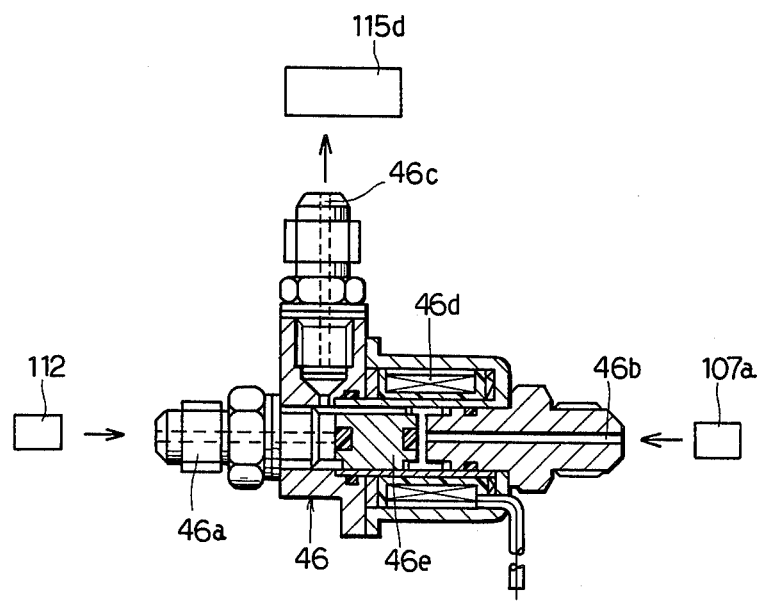

FIGS. (4a) and (4b) are diagrams showing operation of the compressor;

FIG. 5 is a cross-sectional view of a solenoid-operated valve in the variable-volume mechanism in the compressor; and FIG. 6 is a flowchart showing a control program for a microcomputer in the air conditioner control apparatus.

DESCRIPTION OF THE PREFERRED EMBODIMENT

Figure 1:
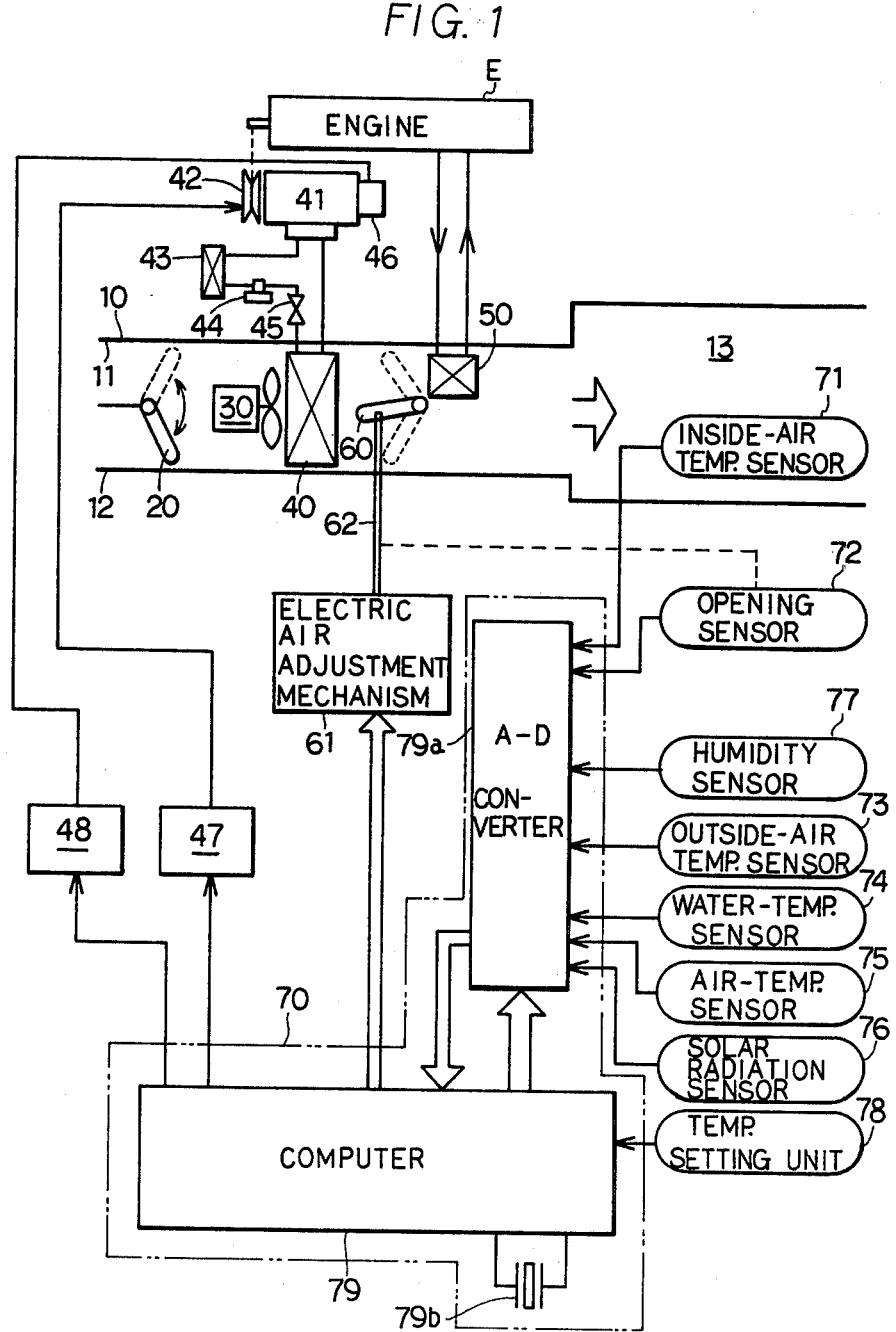
FIG. 1 is a block diagram of an air conditioner control apparatus according to the present invention.

The present invention is particularly useful when embodied in an air conditioner control apparatus as shown in FIG. 1. Although the air conditioner control apparatus is especially suited for use with, and hence shown as being combined with, a known automobile air conditioner, the apparatus of the invention can be used with other air conditioning systems.

The air conditioner includes an air duct 10 in which there are disposed a switch door 20, an air blower 30, an evaporator 40, a heater 50, and an air-mixing damper 60. The switch door 20 is manually actuable to open an air intake port 11 of the air duct 10 to introduce outside air into the air duct 10, and to open an air return port 12 of the air duct 10 to allow air to flow from a car compartment 13 back into the air duct 10.

The air blower 30 draws air from the air intake port 11 or the air return port 12 and delivers a stream of air at a rate dependent on its speed of rotation toward the evaporator 40. The air flow supplied from the air blower 30 is cooled by a cooling medium in the evaporator 40, and the cooled air flow goes out of the evaporator 40 toward the air mixing damper 60. The cooling medium as it is heated by the air flow from the air blower 30 is sent to a compressor 41, which is operatively coupled to an internal combustion engine E by an electromagnetic clutch 42 actuatable by a driver circuit 47. When the electromagnetic clutch 42 is actuated, the compressor 41 is operated by the internal combustion engine E to compress the cooling medium which has been delivered from the evaporator 40 into a cooling medium of high pressure and low temperature, which is fed via a condenser 43, a pressure receiver 44, and an expansion valve 45 as a cooling medium of low pressure and low temperature back to the evaporator 40. When the electromagnetic clutch 42 is not in operation, the compressor 41 is disconnected from the internal combustion engine E.

The compressor 41 has therein a mechanism for changing the volume of the cooling medium as it is discharged, the volume adjustment mechanism being drivable by a solenoid-operated valve 46 which can be actuated by a driver circuit 48.

The heater 50 is supplied with cooling water from the internal combustion engine E to heat the cooled air flow delivered from the evaporator 40 so that a stream of air having a desired temperature can be fed into the compartment 13. The air mixing damper 60 is coupled to a rod 62 of an electric air adjustment mechanism 61. When the electric air adjustment mechanism 61 moves the rod 62 upwardly or downwardly under an atmospheric pressure or a vacuum from the internal combustion engine E, the air mixing damper 60 has its opening Arc reduced or increased dependent on whether the rod 62 is moved upwardly or downwardly. The air mixing damper 60 as thus actuated allows a portion of the cooled air from the evaporator 40 to go to the heater 50 and the remainder of the cooled air from the evaporator 40 to go directly into the compartment 13, dependent on the opening Arc of the air mixing damper 50. The air mixing damper 60 has its minimum opening when the rod 62 is in its uppermost position, directing all of the cooled air from the evaporator 40 directly into the compartment 13. When the rod 62 is in the lowermost position, the opening of the air mixing damper 60 is at its maximum to cause all of the cooled air from the evaporator 40 to go to the heater 50. When the electric air adjustment mechanism 61 is supplied with no atmospheric pressure or no vacuum from the internal combustion engine E to thereby stop the rod 62 somewhere between its uppermost and lowermost positions, the opening of the air mixing damper 60 is kept at a level corresponding to the position in which the rod 62 is stopped.

An electric control circuit 70 generally comprises an analog-to-digital (A/D) converter 79a to which various sensors 71 through 77 are coupled and a digital computer 79 connected to a temperature setting unit 78. An inside-air temperature sensor 71 is located in the compartment 13 for detecting an actual temperature Tr in the compartment 13 and generating an analog signal having a level dependent on the inside-air temperature Tr. An opening sensor 72 is operatively coupled to the rod 62 of the electric air adjustment mechanism 61 for detecting the actual opening Ar of the air mixing damper 60 through the displacement of the rod 62 and generating an analog signal of a level corresponding to the detected opening Ar. An outside-air temperature sensor 73 is positioned in the vicinity of a front grille of a radiator of the car for detecting an actual temperature Tam of surrounding outside air and generating an analog signal having a level corresponding to the outside-air temperature Tam.

A water-temperature sensor 74 is disposed adjacent to an inlet port of the heater 70 for detecting an actual temperature Tw of the cooling water fed from the evaporator and generating an analog signal having a level dependent on the detected water temperature Tw. An air-temperature sensor 75 is located closely to an outlet of the evaporator 40 for detecting an actual temperature Te of the air flow from the evaporator 40 and generating an analog signal having a level corresponding to the detected temperature Te. A solar radiation sensor 76 is disposed at a window of the compartment 13 for detecting an actual amount of solar radiation Ts and producing an analog signal having a level dependent on the amount of solar radiation detected. A temperature sensor 77 is disposed in a suitable position in the compartment 13 for detecting a relative humidity RH of the air in the compartment 13 and producing an analog signal having a level corresponding to the detected relative humidity.

The A/D converter 79a is responsive to a request from the digital computer 79 for converting the analog signals from the sensors 71 through 77 into corresponding digital signals, and supplying the digital computer 79 with these digital signals as being indicative of the inside-air temperature Tr, the opening Ar, the outside-air temperature Tam, the water temperature Tw, the air temperature Te, the amount of solar radiation Ts, and the relative humidity RH in the compartment 18.

The temperature setting unit 78 is mounted in the compartment 13 and produces a temperature setting signal indicative of a desired temperature setting Tset selected manually by a passenger.

The digital computer 79 comprises a microcomputer in the form of an LSI circuit on a single chip. The microcomputer 79 is supplied with a constant voltage from a constant-voltage power supply (not shown) so as to be in a condition ready for operation. The constant-voltage power supply is responsive to the closing of an ignition switch (not shown) for being supplied with a DC voltage from a DC power supply to produce the constant voltage. The microcomputer 79 has a central processing unit (hereinafter referred to as a "CPU"), a memory including ROM and RAM, an input and output unit (hereinafter referred to as an "I/O unit"), and a clock circuit, which are interconnected by bus lines. The memory (RAM) of the microcomputer 79 temporarily stores the digital signals from the A/D converter 79a and the temperature setting signal from the temperature setting unit 78, which signals are received through the I/O unit, and delivers these stored signals selectively to the CPU. The clock circuit generates a clock signal having a predetermined frequency in coaction with a crystal oscillator 79b for allowing the microcomputer 79 to execute a control program based on the clock signal.

The memory ROM in the microcomputer 79 stores the control program for effecting arithmetic operations (described later) in the microcomputer 79.

Figure 2:
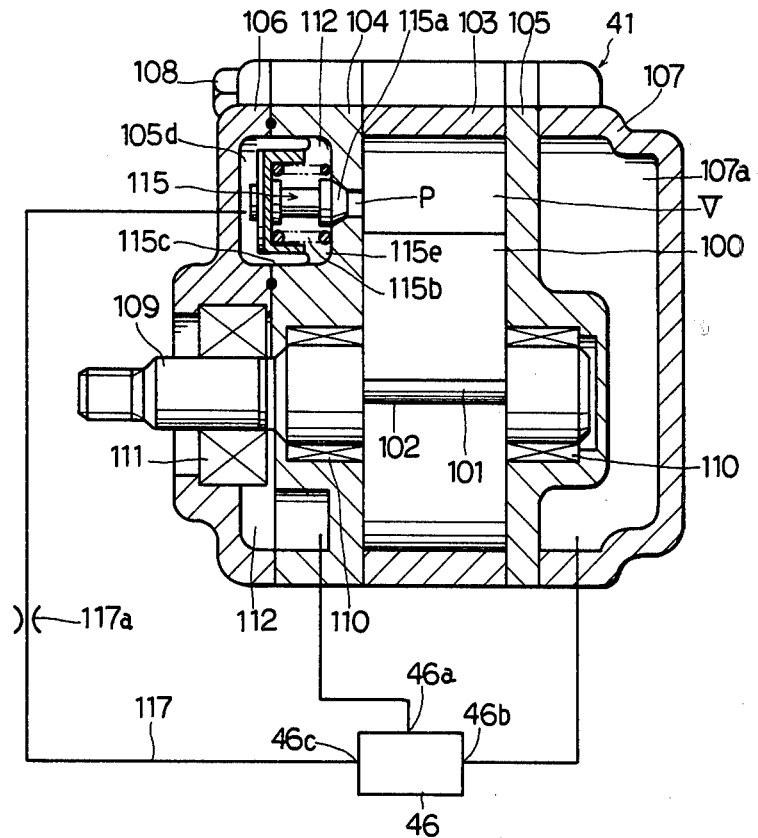
FIG. 2 is a cross-sectional view of a compressor.
Figure 4:
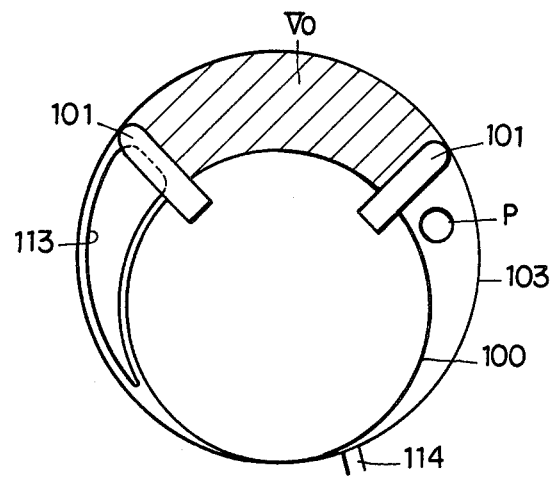
Figure 4:
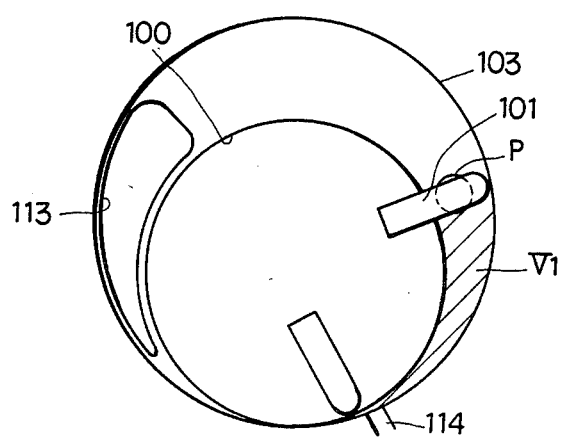

The compressor 41 with the mechanism for discharging the cooling medium in varying volumes will be described. As shown in FIG. 2, the compressor 41 has a cylindrical rotor 100 having slots 102 in which vanes 101 are inserted for slidable movement in the radial direction. Although only two vanes 101 are shown in FIG. 4, there are actually four vanes mounted in the rotor 100. The compressor 41 also has a cylinder 103 for limiting radial reciprocable movement of the vanes 101, and front and rear side plates 104, 105 sandwiching the cylinder 103 axially therebetween with slight gaps left between the rotor 100 and the vanes 101 and the front and rear side plates 104, 105. The rotor 100, the vanes 101, the cylinder 103, and the front and rear side plates 104, 105 jointly define an operating space V. The cylinder 103, the front side plate 104, the rear side plate 105, and housings 106, 107 are fastened together by bolts 108. The rotor 100 is mounted for corotation on a shaft 109 rotatably supported by bearings 110 on the front and rear side plates 104, 105 and drivable by the internal combustion engine E via the electromagnetic clutch 42. The shaft 109 is surrounded by a shaft seal 111 for sealing the interior of the compressor 41 from ambient air.

The front side plate 104 and the housing 106 define a suction chamber 112 for drawing therein the cooling medium from the evaporator 40 when the air conditioner operates in the refrigeration cycle. The cooling medium as drawn in the suction chamber 112 is then introduced into the operating space V through a suction port 113 (FIG. 4) defined through the front side plate 104 until the operating space V is filled with the cooling medium under suction as illustrated in FIG. 4 at (a). The cooling medium in the operating space V is compressed as the volume of the operating space V is reduced. When the cooling medium is compressed to its smallest volume, it is discharged from an outlet 114 in the cylinder 103 through a discharge valve (not shown) into a discharge chamber 107a in the housing 107, and then into the condenser 43 in the refrigeration cycle. According to the present invention, an unloading port P is defined in the front side plate 104 and provides fluid communication between the operating space V and the suction chamber 112. When the unloading port P is open, the cooling medium is not compressed until the operating space V is displaced out of communication with the unloading port P. FIG. 4(b) shows a volume $V_1$ for the operating space at the time when the compression is started while the unloading port P is being open, and FIG. 4(a) shows a volume $V_0$ at the time when the compression is started while the unloading port P is being closed. With the illustrated embodiment, the unloading port P is located such that the volume $V_1$ is in the range of from 30% to 50% of the volume $V_0$.

Figure 3:
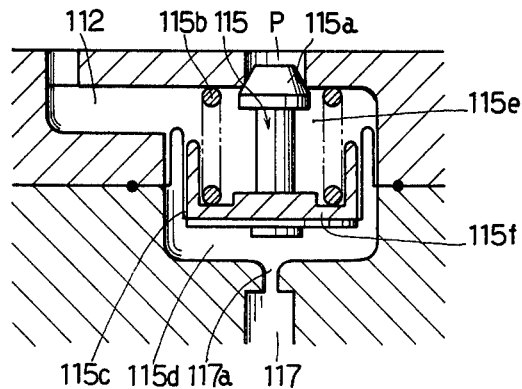
FIG. 3 is a cross-sectional view of a valve in a variable-volume mechanism in the compressor shown in FIG. 2.

The unloading port P is opened and closed by a valve 115 comprising, as shown in FIG. 3, a valve body 115a movable into and out of the unloading port P, a spring 115b for urging the valve body 115a in a direction to open the unloading port P under a predetermined force, a bellowphragm 115c for driving the valve body 115a, and a plate 115f serving as a spring seat and guiding the bellowphragm 115c. The valve body 15a is made of high-strength material such as stainless steel. The valve 115 has a chamber 115d behind the bellowphragm 115c and communicating with a pilot pressure passage 117 so that a pilot pressure, that is, a suction pressure or discharge pressure (as described later), can be applied to the bellowphragm 115c under the control of the solenoid-operated valve 46. The pilot pressure passage 117 has a restrictor 117a for preventing the pilot pressure from being built up abruptly in the chamber 115d. The valve 115 also has a chamber 115e in front of the bellowphragm 115c, in which the pressure in the suction chamber 112 is introduced.

The variable-volume mechanism is composed of the port P and the valve 115, which is controlled for its operation by the solenoid-operated valve 46.

As illustrated in FIG. 5, the solenoid-operated valve 46 has three pressure inlet ports, that is, a suction pressure inlet port 46a, a discharge pressure inlet port 46b, and a pilot pressure outlet port 46c. The suction pressure inlet port 46a introduces the pressure from the suction chamber 112, and the discharge pressure inlet port 46b introduces the pressure from the discharge chamber 107a. The pilot pressure outlet port 46c communicates with the chamber 115d in the valve 115. The pilot pressure outlet port 46c supplied selectively with the suction pressure or the discharge pressure when a valve body 46e of magnetic material is positionally controlled by energizing or de-energizing a coil 46d.

When the suction pressure is introduced into the pilot pressure outlet port 46c, the pilot chamber 115d is held under the suction pressure, allowing the valve body 115a to move into its open position under the force of the spring 115b to thereby open the port P. Conversely, when the discharge pressure is introduced into the pilot pressure outlet port 46c, the pilot chamber 115d is held under the discharge pressure, whereupon the valve body 115a is displaced toward its closed position against the force of the spring 115b to thereby close the port P.

To prevent the solenoid-operated valve 46 from malfunctioning due to its overheating, the solenoid-operated valve 46 is located in contact with a portion of the compressor 41 which has a relatively low temperature, such as a service valve (not shown) or the front housing 106.

Therefore, while the electromagnetic clutch 42 is in operation, the compressor 41 can discharge the cooling medium selectively in the small or large volume when the solenoid-operated valve 46 is opened upon energization of the coil 46d or closed upon de-energization of the coil 46d. The compressor 41 is rendered inoperative when the solenoid-operated clutch 42 is disconnected.

The compressor 41 can thus be switched between three modes of operation, that is, large-volume discharge, small-volume discharge, and stoppage under the control of electric signals.

Operation of the air conditioner control apparatus thus constructed is as follows: When the ignition switch on the car is turned on, the internal combustion engine E operates in an idling mode, and the microcomputer 79 is readied for operation in response to the constant voltage supplied from the constant-voltage power supply. As shown in FIG. 6, the microcomputer 79 then starts, at a step 601, executing arithmetic operations according to the flowchart as shown. It is assumed now that the temperature setting unit 78 is manually operated to generate a temperature setting signal indicative of a desired temperature Tset.

When the computer program goes to a step 602, the actual temperature Tr in the compartment 13 and the actual opening Ar of the air mixing damper 60 are detected as analog signals by the inside-air temperature sensor 71 and the opening sensor 72, respectively, the actual temperature Tam outside the car and the actual temperature Tw of the cooling water are detected as analog signals by the outside-air temperature sensor 73 and the water-temperature sensor 74, respectively, the actual temperature Te at the outlet of the evaporator 40 and the amount of solar radiation Ts are detected as analog signals respectively by the air temperature sensor 75 and the solar radiation sensor 76, and the relative humidity RH in the compartment 13 is detected as an analog signal by the humidity sensor 77. These detected analog signals are converted by the A/D converter 79a into corresponding digital signals, which are temporarily stored in the memory (RAM) in the microcomputer 79. The temperature setting signal from the temperature setting unit 78 is also stored temporarily in the memory (RAM) in the microcomputer 79.

At a step 603, the CPU reads data on the thermal conditions such as the temperature setting Tset, the inside-air temperature Tr, the outside-air temperature Tam, and the amount of solar radiation Ts out of the memory (RAM), reads a constant C and gains Kset, Kr, Kam, Ks which are preset and stored in the memory (ROM), and computes a temperature TAO at which cooled air is to be introduced into the compartment 13 according to the following equation:

$$TAO = Kset \cdot Tset - Kr \cdot Tr - Kam \cdot Tam - Ks \cdot Ts + C$$

The temperatuer TAO is indicative of an air temperature required for the inside-air temperature Tr to approach and be maintained at the temperature setting Tset without being influenced by disturbing conditions such as the outside-air temperature Tam and the amount of solar radiation Ts. A reduction in the temperature TAO indicates that the degree of cooling required be increased. Automatic temperature control effected by computing the temperature TAO of cooled air is described in Japanese laid-open patent application No. 55-77659, for example.

At a program step 604, a mode of operation for the compressor 41 is determined on the basis of the termperature TAO which has been computed at the step 603. The decision step is executed to select an operation mode for increasing the volume of the cooling medium discharged from the compressor 41 when an increase in the cooling power is requested. This can be carried out by comparing the temperature TAO with two preset reference values. When it is determined that the compressor 41 be operated in a large-volume mode, the program goes to a step 609 in which a command signal is given to the driver circuit 47 to connect the electromagnetic clutch 42 and a command signal is given to the driver circuit 48 to close the solenoid-operated valve 46. When it is determined, on the other hand, that the compressor 41 be operated in a small-volume mode or a stop mode, the program proceeds to a step 605 or a step 606, which determines whether the compressor 41 should be operated in the small-volume mode or the large-volume mode dependent on the relative humidity RH in the compartment 13.

More specifically, in the step 605, one of the three operation modes (stoppage, small-volume, and large-volume) is selected again by comparing the relative humidity RH with two preset reference values, so that the volume of the cooling medium as discharged from the compressor 41 can be increased as the relative humidity RH in the compartment 13 is increased. Likewise, in the step 606, one of the two operation modes (small-volume and large-volume) is selected again by comparing the relative humidity RH with one preset reference value, so that the volume of the cooling medium as discharged from the compressor 41 can be increased as the relative humidity RH in the compartment 13 is increased. The reference values used for comparison can be set up as desired in the humidity range of from 30% to 70% which is generally known as being comfortable to people. The reference value used in the step 606 may be equal to either one of the reference values in the step 605, or may differently be established.

After one of the operation modes has been selected, the program then goes to a step 607, a step 608, or a step 609 respectively in the mode of stoppage, small-volume discharge, or large-volume discharge, and predetermined command signals are given to the driver circuits 47, 48. At the step 607, the driver circuit 47 is supplied with a command signal to disconnect the electromagnetic clutch 42. At the step 608, the driver circuit 47 is supplied with a command signal to connect the electromagnetic clutch 42, and the driver circuit 48 is supplied with a command signal to open the solenoid-operated valve 46. At the step 609, the electromagnetic clutch 42 is connected, and the solenoid-operated valve 46 is closed.

One at a time of the operation modes for the compressor 41 can thus be determined dependent on the degree of cooling required and the relative humidity according to the precessing in the steps 604 through 609. The following table indicates operation modes of the compressor which are selected with respect to relative humidities and degrees of cooling required.

| Discharge air temperatures required | Relative Humidities | Operation modes |
|---|---|---|
| High (degree of cooling required: small) | Low | Stop (Zero vol.) |
| | Medium | Small volume |
| | High | Large volume |
| Medium (degree of cooling required: medium) | Low, Medium | Small volume |
| | High | Large volume |
| Low (degree of (cooling required: high) | — | Large volume |

The above table indicates that the higher the degree of cooling required is and the higher the relative humidity is, the greater the volume of cooling medium discharged from the compressor is. The conditions for increasing the volume of cooling medium discharged from the compressor are given priority such that the volume of discharge will be increased when the relative humidity is high even if the degree of cooling required is low, and when the degree of cooling required is high even if the relative humidity is low.

Accordingly, there is no possibility for the air conditioner to suffer from a too low cooling capability and to humidify the comartment excessively while the control apparatus of the present invention is in operation. Furthermore, as the degree of cooling required and the relative humidity become low, the volume of cooling medium discharged from the compressor is reduced correspondingly, so that the power needed for driving the compressor can be reduced. This allows the air conditioner to have an increased energy efficiency. Since the compressor is not intermittently switched between the mode of large-volume discharge operation and the mode of stoppage, the mechanical moving parts are more durable in operation. Since the evaporator has its cooling capability controlled against abrupt changes, adjustment of the temperature of discharged air can be effected by the air mixing damper 60 with a good response without the problem of quick variations in the temperature of discharge air.

The reference values used in the steps 604, 605, 606 for comparison may be given hysteresis to prevent the operation modes from changing abruptly. Such hysteresis can be given in the usual manner in the art of computer program designs by establishing first and second values having certain widths as one reference value, selecting either one of the first and second values dependent on the last compressor operation mode determined previously, and comparing the selected value with the temperature TAO or the relative humidity RH.

When the computer program goes to a step 610, an opening SW of the air mixing damper 60 which is necessary to equalize the temperature TAO to an actual temperature of discharge air is computed on the basis of the temperature TAO computed at the step 103, the water temperature Tw and the air temperature Te which are stored in the memory (RAM), and a constant To stored in the memory (ROM) according to the following equation:

$$SW = 100 \times (TAO - Te)/(Tw - Te - To) \, (\%)$$

The computed opening SW is compared with the actual opening Ar of the air mixing damper 60 which is stored in the memory (RAM), and a command signal is issued on the basis of the result of the comparison to supply an atmospheric pressure or a vacuum to the electric air adjustment mechanism 61. This process of comparison may also be provided with hysteresis as described in Japanese laid-open patent application No. 55-77659.

The computer program will be repeatedly executed to adjust the volume of cooling medium as discharged from the compressor in response to the degree of cooling required and the humidity in the compartment, so that the temperature of air in the compartment can be kept at a preset level and the compartment can be prevented from being excessively humid.

While the present invention has been described in detail with respect to a particular preferred embodiment, it may be modified or combined with related devices as follows:

(1) The compressor may be provided with a mechanism capable of changing its volume of discharged cooling medium in more than three steps or on a continuous basis.

(2) Means may be added for detecting dew condensation on windows and controlling the compressor to increase its volume of discharge dependent on the detection. The increased volume of discharge may be at maximum regardless of the degree of cooling required or the relative humidity at that time.

(3) A manual switch may be added to increase the volume of discharge from the compressor upon actuation. The increased volume of discharge may be at maximum regardless of the degree of cooling required or the relative humidity at that time.

(4) A portion or all of the operations which are shown to be effected by the microcomputer 79 in the electric control circuit 70 under the programmed control may be carried out by an analog circuitry. For example, the relationships between the operation modes of the compressor and the conditions as enumerated in the above table may be determined by a combination of an amplifier circuit responsive to the inside-air temperature and the temperature setting, an amplifier circuit responsive to the humidity, a plurality of comparator circuits for comparising output signals from the amplifier circuits with predetermied threshold values, and a logic circuit for effecting logical operations on outputs from the comparator circuits.

(5) First and second aspects as claimed of the present invention are effectively applicable to an air conditioner which does not have the heater 50 and the air mixing damper 60 for adjusting the amount of air heated thereby, or which has such heater 50 and air mixing damper 60 that is adjustable independently of the compressor 41.

According to the first aspect of the invention, the variable-volume compressor can automatically be controlled in response to a signal indicative of the humidity in the area to be air-conditioned, so that the air-conditioned area can properly dehumidified while reducing variations in the load on the mechanical driver means and abrupt changes in the degree of cooling.

According to the second aspect, the variable-volume compressor can automatically be controlled in response to both signals indicative of the humidity in the air-conditioned area and the degree of cooling for effective temperature and humidity adjustment.

The present invention has a third aspect claimed in which the variable-volume compressor and the heating adjustment mechanism are controlled by a common signal indicative of the degree of cooling with a simplified arrangement of sensors and electric circuit for the control of temperature and humidity.

Although a certain preferred embodiment has been shown and described, it should be understood that many changes and modifications may be made therein without departing from the scope of the appended claims.

What is claimed is:

1. An apparatus for controlling an air conditioner having a refrigeration cycle including an evaporator disposed in an air passage for supplying air to an area to be air-conditioned and a compressor having a mechanism for varying a volume of discharge from the compressor, a heater disposed in the air passage, and a mechanism for adjusting the amount of heat generated by the heater, said apparatus comprising:

first signal generating means responsive to a humidity in the area to be air-conditioned for producing a first signal indicative of the humidity;

second signal generating means responsive to a degree of cooling required in the area to be air-conditioned for producing a second signal indicative of the degree of cooling;

third signal generating means responsive to a temperature related to a stream of air discharged from the evaporator for producing a third signal indicative of the temperature;

fourth signal generating means responsive to a temperature related to a capability of the heater for producing a fourth signal indicative of the last-mentioned temperature; and means responsive to said first and second signals for actuating the mechanism for varying the volume of discharge from the compressor and responsive to said second, third and fourth signals for actuating the mechanism for adjusting the amount of heat generated by the heater.

* * * * *